United States Patent [19]

Withers, Jr.

[11] Patent Number: 4,571,829
[45] Date of Patent: Feb. 25, 1986

[54] QUICK RELEASE HACKSAW BLADE TENSIONING DEVICE

[76] Inventor: Ernest A. Withers, Jr., 5637 Mountainbrooke Ct., Stone Mountain, Ga. 30087

[21] Appl. No.: 617,110

[22] Filed: Jun. 4, 1984

[51] Int. Cl.$^4$ .............................................. B27B 21/02
[52] U.S. Cl. ........................................ 30/144; 30/330; 30/331; 145/33 A; 145/33 G
[58] Field of Search ......................... 30/144, 330, 331; 145/33 A, 33 R, 33 E

[56] References Cited

U.S. PATENT DOCUMENTS

| | | | |
|---|---|---|---|
| 924,882 | 6/1909 | Boenker et al. | 30/144 X |
| 1,952,993 | 3/1934 | Laemmel | 30/144 |
| 2,215,493 | 9/1940 | Anderson et al. | 30/144 |
| 3,329,187 | 7/1967 | Cowley | 145/33 A |
| 4,349,059 | 9/1982 | Hepworth et al. | 145/33 A |

FOREIGN PATENT DOCUMENTS 186766 12/1963 Sweden ............................ 145/33 A Primary Examiner—E. R. Kazenske
Assistant Examiner—Willmon Fridie, Jr.
Attorney, Agent, or Firm—James B. Middleton

[57] ABSTRACT

A blade tensioning device for a hacksaw or the like. A generally conventional hacksaw is provided with a plate in one leg of the frame, and the blade receiving pin is on the plate. A toggle joint is arranged to rotate the plate to move the pin and loosen the saw blade or to rotate the plate to move the pin and tension the blade. When the blade is tensioned, the toggle joint locks to hold the blade in tension. The frame has a bezel to fit over the end of the blade when the blade is in tension to prevent lateral movement of the blade. The opposite frame member may include an adjustable link to adjust for saw blade length or slight frame bending.

5 Claims, 5 Drawing Figures

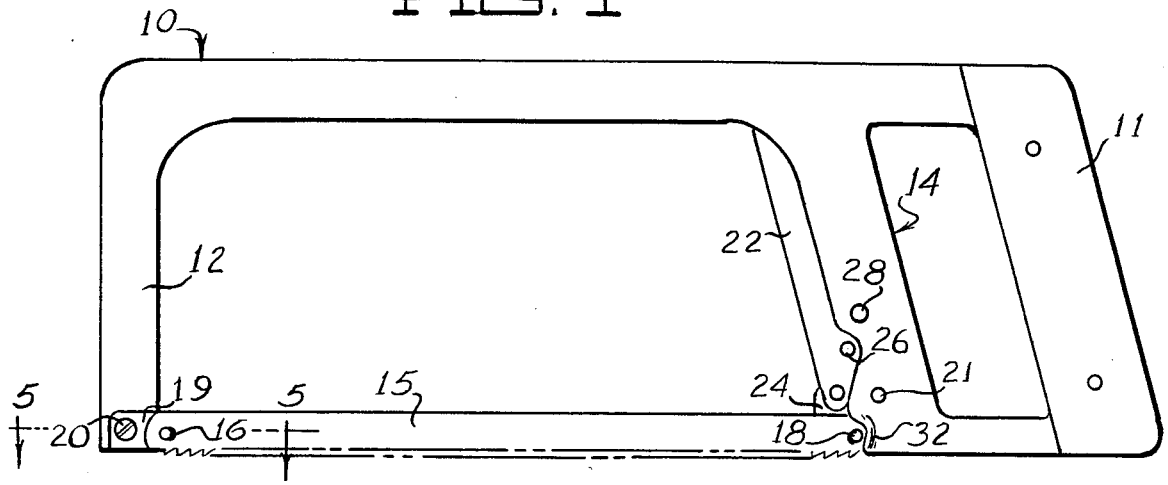
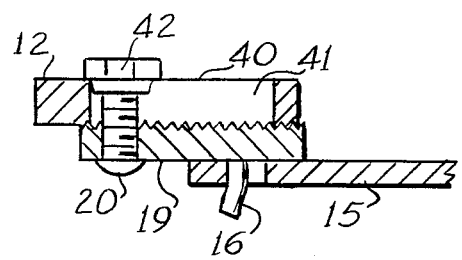
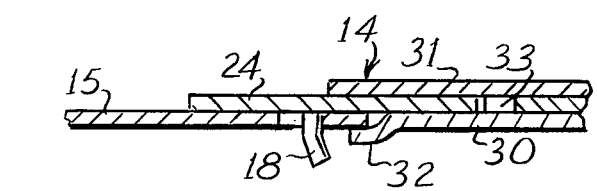
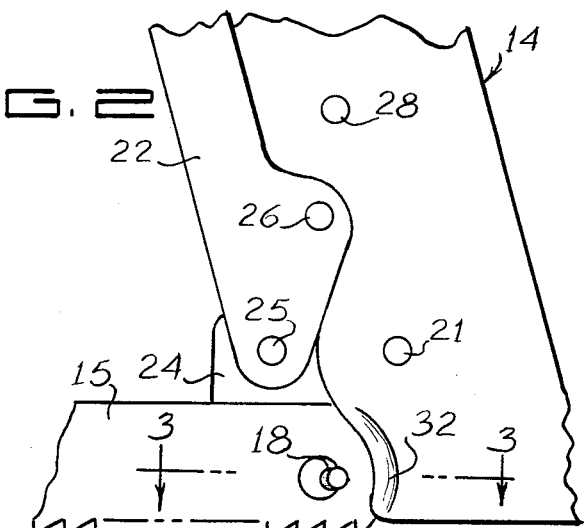
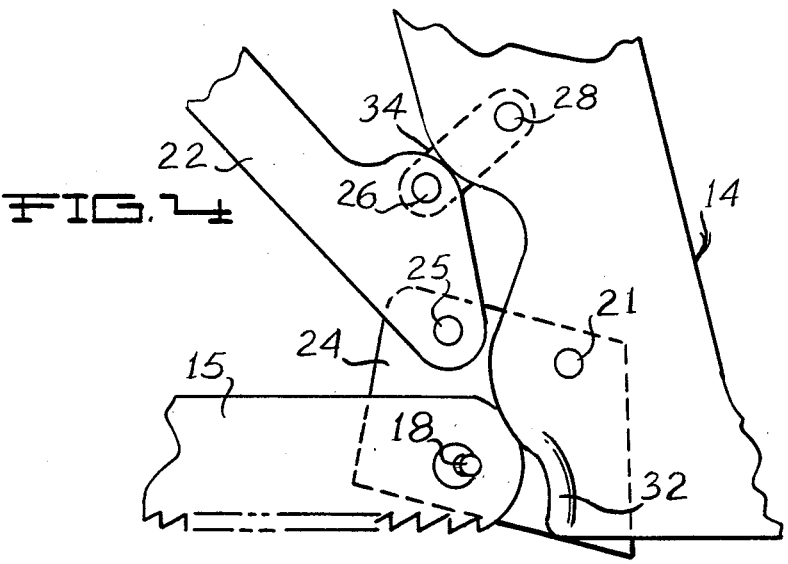

QUICK RELEASE HACKSAW BLADE TENSIONING DEVICE

INFORMATION DISCLOSURE STATEMENT

A conventional hacksaw comprises a generally U-shaped frame having a blade stretched across the open legs of the U, and a handle adjacent to one of the legs. The most commonly used mechanism for removably tensioning a blade across the frame is to provide a pair of laterally extending pins, one of the pins being fixed with respect to the frame, and the other pin being carried by a stud. A wing nut or the like moves the stud with respect to the frame to tension the blade. While this structure will adequately support a blade, it will be understood that changing blades is relatively time consuming since the nut must be rotated sufficiently to release the tension on the blade and provide enough slack to allow the blade to be removed from both pins. A new blade is then installed, and the nut retightened on the stud.

There have been some efforts to provide an improved blade tensioning device for hacksaws or the like, but these have normally comprised quite complex arrangements that are relatively inconvenient to use, and many of the prior art devices cannot provide the required rigidity for the saw frame and the blade.

SUMMARY OF THE INVENTION

This invention relates to hacksaws and the like, and is more specifically concerned with a quick release blade tensioning device.

The present invention provides a blade tensioning device for a hacksaw or the like, the tensioning device including a plate pivotally carried by the hacksaw frame, the plate carrying a blade holding pin. Lever means is provided for rotating the plate with respect to the hacksaw frame for selectively tightening and loosening the hacksaw blade by moving the blade holding pin. The lever means for rotating the plate comprises part of toggle means for rotating the plate and locking the plate in blade tensioning position. In one embodiment of the invention, the hacksaw may also include means for adjusting a blade receiving pin on the opposite side of the frame.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of one form of hacksaw made in accordance with the present invention;

FIG. 2 is an enlarged, fragmentary view showing the tensioning apparatus of the saw shown in FIG. 1;

FIG. 3 is a cross-sectional view taken substantially along the line of 3—3 in FIG. 2;

FIG. 4 is a view similar to FIG. 2, but showing the mechanism in blade releasing position; and, FIG. 5 is an enlarged cross-sectional view taken substantially alaong the line 5—5 in FIG. 1.

DETAILED DESCRIPTION OF THE EMBODIMENT

Referring now more particularly to the drawings, and to that embodiment of the invention here presented by way of illustration, FIG. 1 illustrates a hacksaw having a frame 10 with a handle 11 at one side of the frame. The frame 10 is approximately U-shaped including depending legs 12 and 14, the handle 11 being adjacent to the leg 14. Between the extending ends of the legs 12 and 14, there is a hacksaw blade 15 carried by pins 16 and 18.

As will be discussed in more detail hereinafter, it will be seen that the pin 16 is carried by an adjustment link 19 that is fixed to the frame 10 by a screw 20.

The pin 18 is carried by a portion of the quick release mechanism to be discussed hereinafter. The pin 18 is rotatable about the pivot 21 on movement of the lever 22. Thus, when the lever 22 is placed alongside the leg 14 as illustrated in FIG. 1, the pin 18 is in its blade tensioning position; and, when the lever 22 is moved counterclockwise as viewed in FIG. 1, the pin 18 will rotate in a clockwise direction about the pivot 21 to release the tension on the blade 15 and allow the blade to be removed.

Looking now at FIG. 2 of the drawings, it will be seen that the device of the present invention includes a rotatable connecting plate 24, it being understood that the plate 24 is pivotally fixed to the leg 14 at the pivot 21. The plate 24 also carries the pin 18 so that rotation of the plate 24 in a clockwise direction will loosen the blade 15 while rotation of the plate 24 in a counterclockwise direction will tighten the blade 15.

To achieve the desired motion of the connecting plate 24, the lever 22 is pivotally connected to the plate 24 at the pivot point 25. The lever 22 is then pivoted with respect to the leg 14 through a link 34, the two ends of the link being pivoted to the lever 22 at 26 and to the frame 14 at 28. It will therefore be understood by those skilled in the art that a toggle joint is provided. The pivot 26 acts as the center pivot, or toggle, and the lower area of the lever 22 between the pivots 25 and 26 acts as one of the toggle arms while the link 34 acts as the other toggle arm. As is conventional with toggle joints, when the pivot 26 passes a line drawn through the pivots 26 and 28, the toggle joint is locked. In such a condition, it will be seen that the tension of the blade 15 urges the connecting plate 24 to rotate clockwise, thereby urging the pivot 25 up. This force tends to cause the lever 22 to rotate clockwise; but, since the lever 22 is against the leg 14, the lever cannot move and the arrangement is locked in place and held by the tension of the blade 15.

Looking at FIG. 3 of the drawings, the pins such as the pins 16 and 18 are normally angled somewhat to assist in retaining the blade 16 in position on the pins. The pin 18 is shown angled as is conventional; however, those skilled in the art will be aware that, with sufficient lateral stress, a hacksaw blade may be urged outwardly along the pins 16 and 18. Since the blade will then no longer lie against a frame member, the blade will become very unstable and one must pause to manipulate the blade tensioning mechanism and correct the problem.

To overcome this difficulty, it will be seen that the frame member 14 is laminated, and includes a front layer 30 and a back layer 31, the plate 24 being pivotally disposed in a slot 33 between the front and back layers. The front layer 30 of the frame member 14 defines a bezel 32 for receiving the end of the blade 15 when the plate 24 is in blade tensioning position. It will therefore be seen that, when the plate 24 is rotated in a counterclockwise direction to tension the blade 15, the rearmost end of the blade 15 will be inserted beneath the bezel 32. So long as the blade 15 is beneath the bezel 32, it will be seen that the blade cannot move outwardly along the pin 18. FIG. 2 of the drawings shows that the bezel 32 is shaped somewhat to surround the end of a conventional hacksaw blade to provide adequate holding of the blade. Obviously, the slot 33 can be provided by other structural arrangements in the event the laminated construction is not preferred.

Attention is next directed to FIG. 4 of the drawings for a better understanding of the construction of the tensioning apparatus made in accordance with the present invention. In FIG. 4, the lever 22 is shown in its counterclockwise rotated position, and it will be seen that the link 34 connects the pivot points 26 and 28. In FIG. 4, the parts of the toggle arrangement are shown, and including broken line representations in order to show the entire shape of the pieces involved. It will therefore be seen that the connecting plate 24 is somewhat trapezoidal in shape, the pivots 25 and 21 being adjacent to the shorter base of the trapezoid, while the pin 18 is adjacent to the longer base of the trapezoid. With this arrangement, it will be understood that, when the plate 24 is rotated to blade tensioning position, there will be a substantial length of the plate 24 held in the slot 33 to provide lateral support for the plate 24. This, in combination with the bezel 32 for holding the blade 15, provides an extremely sturdy arrangement to support the hacksaw blade.

It will also be seen that the plate 24 is rotatable about the pivot 21 by moving the lever 22; and, in order to lock the mechanism in position, the above mentioned toggle arrangement is used. It will be seen that, as the lever 22 is moved clockwise, the pivot 28 is fixed with respect to the frame member 14, and the pivot point 25 on the lever 22 is constrained to move downwardly, requiring that the link 34 rotate in a counterclockwise direction. This action will move the pivot point 26 counterclockwise about the pivot point 28. In the course of such motion, it will be seen that the pivot points 28, 26 and 25 will become aligned. The proportions of the parts are such that, when these pivot points are aligned, the pin 18 will have been moved rearwardly sufficiently to tension the blade 15, and there will be a relatively large force exerted by the blade 15. Because of this large force, a considerable effort will be required to move the lever 22 farther.

With the above described arrangement, those skilled in the art will understand that a conventional toggle joint is formed, and the system is locked when the lever 22 is against the leg 14.

It should now be understood by those skilled in the art that the lever 22 can be moved downwardly as shown in FIG. 4 of the drawings, and a blade 15 can be placed on the pins 16 and 18. With the blade 15 in place, the lever 22 will be moved towards the leg 14 to move the pin 18 in a blade tensioning direction. When the lever 22 is forced against the leg 14, the tension of the blade 15 will assist in holding the lever 22 in position to provide a very secure locking mechanism for the blade 15.

It will be understood that the toggle mechanism shown, and described above, does not allow significant variation in blade length. In the event the saw blades used are not of sufficiently standard length, or the frame 10 becomes distorted, an additional adjustment may be required. Thus, an additional blade adjustment is shown in FIGS. 1 and 5, this adjustment being arranged to vary the position of the pin 16.

It will be seen that the leg 12 of the frame 10 has an inwardly directed extension 40, the extension 40 including a slot 41 which receives the screw 20. A nut 42 threadedly engages the screw 20, and the nut 42 may have a portion riding within the slot 41 to prevent the nut 42 from rotating.

The adjustment link 19 carries the pin 16, and the screw 20 passes through the link 19 to secure the link 19 to the extension 40. It will be seen that the contiguous surfaces of the link 19 and the extension 40 are textured, or serrated, to assure that the link 19 will not inadvertently slip with respect to the extension 40.

With this arrangement, it will be readily understood by those skilled in the art that the screw 20 may be loosened, and the link 19 adjusted with respect to the extension 40 to place the pin 16 in the desired position. Once the pin 16 is appropriately placed, the screw 20 can be tightened, and the blade 15 can be readily removed and a new blade installed simply through the use of the toggle mechanism on the leg 14 of the frame 10.

It will therefore be seen that the present invention provides a hacksaw or the like including a toggle for releasing the saw blade and for locking the saw blade into position. With the use of the rotatable plate, the fixing of the blade carrying pin with respect to the frame is very rigid, and the toggle arrangement is utilized to rotate the plate as desired. In addition, the bezel for holding at least one end of the hacksaw blade provides an additional security to prevent inadvertent removal of the blade from the blade carrying pins. It is well known to those skilled in the art to provide an extendable frame 10, and both fixed frames and extendable frames are contemplated in conjunction with the apparatus of the present invention.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. A blade tensioning device, for a saw including a frame having a first leg and a second leg and a blade extending between said first leg and said second leg, a first pin carried by said first leg and a second pin carried by said second leg, said first pin and said second pin receiving said blade thereon, said blade tensioning device including a connecting plate pivotally mounted on a first pivot pin on said first leg and having said first pin extending therefrom, and a lever for rotating said plate in a first direction for moving said first pin towards said second leg and loosening said blade and for rotating said plate in a second direction for moving said first pin towards said first leg and tensioning said blade, the arrangement being such that said connecting plate is rotated for moving said first pin for loosening and tightening said blade, and further including toggle means pivotally connecting said plate to said first leg through said lever and spaced from said first pivot pin for rotating said connecting plate, said lever for rotating said plate being pivotally connected to said plate and constituting operating means for said toggle means.

2. A blade tension device as claimed in claim 1, said first leg of said frame defining a slot therein for pivotally receiving said connecting plate, the arrangement being such that said slot in said frame supports said plate for lateral rigidity.

3. A blade tensioning device, for a saw including a frame having a first leg and a second leg and a blade extending between said first leg and said second leg, a first pin carried by said first leg and a second pin carried by said second leg, said first pin and said second pin receiving said blade thereon, said blade tensioning device including a connecting plate pivotally mounted on said first leg and having said first pin extending thereform, and a lever for rotating said plate in a first direction for moving said first pin towards said second leg and loosening said blade and for rotating said plate in a second direction for moving said first pin towards said first leg and tensioning said blade, said first leg of said frame defining a slot therein for pivotally receiving said connecting plate, the arrangement being such that said slot in said frame supports said plate for lateral rigidity, said lever including a first pivot point pivotally connecting said lever to said plate and a second pivot point, said first pivot point and said second pivot point defining a first toggle arm, a link having one end connected to said second pivot point and an opposite end connected to a third pivot point, said third pivot point being on said first leg of said frame, said link defining a second toggle arm, the arrangement being such that rotation of said lever causes motion of said second pivot point and consequent rotation of said connecting plate.

4. A blade tensioning device as claimed in claim 3, said slot including a front overlying said connecting plate and being adjacent to said first pin, said front of said slot defining a bezel for receiving an end of said blade when said pin is moved towards said first leg for tensioning said blade.

5. A blade tensioning device as claimed in claim 1, and further including an adjustment link carried by said second leg of said frame, said second pin extending from said adjustment link, and means for varying the position of said adjustment link with respect to said second leg, said second leg of said frame including an extension extending from said second leg towards said first leg, said extension defining a slot therein, fastening means carried by said adjustment link and receivable through said slot in said extension for selectively fixing said adjustment link with respect to said extension.

* * * * *